United States Patent
Yadav et al.

(10) Patent No.: US 10,248,660 B2
(45) Date of Patent: *Apr. 2, 2019

(54) MECHANISM FOR CONVERTING ONE TYPE OF MIRROR TO ANOTHER TYPE OF MIRROR ON A STORAGE SYSTEM WITHOUT TRANSFERRING DATA

(71) Applicant: NetApp Inc., Sunnyvale, CA (US)

(72) Inventors: Vikas Yadav, Sunnyvale, CA (US); Raghu R. Arur, Sunnyvale, CA (US); Amol Chitre, Sunnyvale, CA (US)

(73) Assignee: NetApp Inc., Sunnyvale, CA (US)

(*) Notice: Subject to any disclaimer, the term of this patent is extended or adjusted under 35 U.S.C. 154(b) by 5 days.

This patent is subject to a terminal disclaimer.

(21) Appl. No.: 15/430,876

(22) Filed: Feb. 13, 2017

(65) Prior Publication Data

US 2017/0169053 A1   Jun. 15, 2017

Related U.S. Application Data

(63) Continuation of application No. 12/950,281, filed on Nov. 19, 2010, now Pat. No. 9,569,460, which is a
(Continued)

(51) Int. Cl.
  *G06F 3/06* (2006.01)
  *G06F 17/30* (2006.01)
  *G06F 11/20* (2006.01)

(52) U.S. Cl.
  CPC ........ *G06F 17/30212* (2013.01); *G06F 3/065* (2013.01); *G06F 3/0619* (2013.01);
  (Continued)

(58) Field of Classification Search
  CPC ........... G06F 11/2082; G06F 17/30088; G06F 17/30097; G06F 17/30212; G06F 3/0619; G06F 3/0643; G06F 3/065; G06F 3/0683
  See application file for complete search history.

(56) References Cited

U.S. PATENT DOCUMENTS

| | | |
|---|---|---|
| 4,570,217 A | 2/1986 | Allen et al. |
| 5,163,131 A | 11/1992 | Row et al. |

(Continued)

OTHER PUBLICATIONS

"Placing Replicated Data to Reduce Seek Delays," Sedat Akyurek and Kenneth Salem, Aug. 1991, Proceedings of USENIX File System Conference, May 1992 Department of Computer Science, University of Maryland, UMIACS-TR-91-121, CS-TR-2746, 22 pgs.

(Continued)

*Primary Examiner* — Mark D Featherstone
*Assistant Examiner* — Navneet Gmahl
(74) *Attorney, Agent, or Firm* — Cooper Legal Group, LLC

(57) ABSTRACT

Embodiments of the present invention provide a mechanism for converting an existing mirror relationship between an original dataset at a source storage system and a copy of the original dataset at a destination system to a new mirror without discarding the existing copy of the original dataset and without transferring data to create a new dataset to replace the copy of the original dataset at the destination storage system. Rather, a directory structure (including file attributes) of the source storage system is transferred to the destination storage system and a comparison is made to identify file attributes at the destination system that match the transferred file attributes. If a match is found, a mapping between the matched file attributes is created. Subsequent updates to the to destination storage system can be done using a technique other than the one that was used to create a copy of the source dataset.

20 Claims, 10 Drawing Sheets

Related U.S. Application Data continuation of application No. 11/854,309, filed on Sep. 12, 2007, now Pat. No. 7,865,475.

(52) U.S. Cl.
CPC .......... *G06F 3/0643* (2013.01); *G06F 3/0683* (2013.01); *G06F 11/2069* (2013.01); *G06F 11/2082* (2013.01); *G06F 17/30088* (2013.01); *G06F 17/30097* (2013.01)

(56) References Cited

U.S. PATENT DOCUMENTS

| | | | |
|---|---|---|---|
| 5,202,979 A | 4/1993 | Hillis et al. | |
| 5,278,979 A | 1/1994 | Foster et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,835,953 A | 11/1998 | Ohran | |
| 5,931,918 A | 8/1999 | Row et al. | |
| 5,941,972 A | 8/1999 | Hoese et al. | |
| 5,963,962 A | 10/1999 | Hitz et al. | |
| 5,996,047 A * | 11/1999 | Peacock ............ | G06F 17/30067 707/E17.01 |
| 6,065,037 A | 5/2000 | Hitz et al. | |
| 6,173,293 B1 | 1/2001 | Thekkath et al. | |
| 6,212,531 B1 | 4/2001 | Blea et al. | |
| 6,289,356 B1 | 9/2001 | Hitz et al. | |
| 6,311,193 B1 | 10/2001 | Sekido | |
| 6,425,035 B2 | 7/2002 | Hoese et al. | |
| 6,453,325 B1 | 9/2002 | Cabrera et al. | |
| 6,611,850 B1 | 8/2003 | Shen | |
| 6,636,878 B1 | 10/2003 | Rudoff | |
| 6,643,654 B1 | 11/2003 | Patel et al. | |
| 6,665,815 B1 | 12/2003 | Goldstein et al. | |
| 6,675,177 B1 | 1/2004 | Webb | |
| 6,691,245 B1 | 2/2004 | Dekoning | |
| 6,704,885 B1 | 3/2004 | Salas-Meza et al. | |
| 6,708,265 B1 * | 3/2004 | Black .................... | G06F 3/0607 711/202 |
| 6,721,764 B2 | 4/2004 | Hitz et al. | |
| 6,748,504 B2 | 6/2004 | Sawdon et al. | |
| 6,785,786 B1 | 8/2004 | Gold et al. | |
| 6,799,189 B2 | 9/2004 | Huxoll | |
| 6,829,617 B2 | 12/2004 | Sawdon et al. | |
| 6,862,609 B2 | 3/2005 | Merkey | |
| 6,895,468 B2 | 5/2005 | Rege et al. | |
| 6,993,539 B2 | 1/2006 | Federwisch et al. | |
| 7,007,046 B2 | 2/2006 | Manley et al. | |
| 7,010,553 B2 | 3/2006 | Chen et al. | |
| 7,039,663 B1 | 5/2006 | Federwisch et al. | |
| 7,043,485 B2 | 5/2006 | Manley et al. | |
| 7,174,352 B2 | 2/2007 | Kleiman et al. | |
| 7,216,135 B2 | 5/2007 | Sawdon et al. | |
| 7,225,204 B2 | 5/2007 | Manley et al. | |
| 7,243,115 B2 * | 7/2007 | Manley ............... | G06F 11/2066 |
| 7,373,364 B1 | 5/2008 | Chapman | |
| 7,454,445 B2 | 11/2008 | Lewis et al. | |
| 7,464,238 B1 * | 12/2008 | Yadav ................. | G06F 11/1456 711/114 |
| 2002/0107877 A1 | 8/2002 | Whiting et al. | |
| 2003/0069889 A1 * | 4/2003 | Ofek .................... | G06F 11/1451 |
| 2003/0158834 A1 * | 8/2003 | Sawdon ............ | G06F 17/30067 |
| 2003/0158873 A1 * | 8/2003 | Sawdon ............ | G06F 17/30067 |
| 2003/0182313 A1 * | 9/2003 | Federwisch ......... | G06F 11/2066 |
| 2003/0182325 A1 * | 9/2003 | Manley ............... | G06F 11/2066 |
| 2003/0182330 A1 | 9/2003 | Manley et al. | |
| 2003/0195903 A1 * | 10/2003 | Manley ............... | G06F 11/2066 |
| 2004/0078419 A1 * | 4/2004 | Ferrari .................... | H04L 29/06 709/201 |
| 2005/0015407 A1 * | 1/2005 | Nguyen .............. | G06F 11/2069 |
| 2007/0079089 A1 * | 4/2007 | Ohran ................. | G06F 11/1451 711/162 |
| 2007/0185852 A1 * | 8/2007 | Erofeev ............ | G06F 17/30123 |
| 2007/0185937 A1 * | 8/2007 | Prahlad ............. | G06F 17/30212 |
| 2007/0185939 A1 * | 8/2007 | Prahland ........... | G06F 17/30144 |
| 2007/0234105 A1 * | 10/2007 | Quinn ................. | G06F 11/2058 714/6.12 |
| 2007/0234106 A1 * | 10/2007 | Lecrone ............. | G06F 11/2058 714/6.12 |
| 2009/0043978 A1 * | 2/2009 | Sawdon ............. | G06F 17/3015 711/162 |

OTHER PUBLICATIONS

"Disk Shadowing,", Dina Bitton and Jim Gray, 1988, Proceedings of the 14th VLDB Conference, Los Angeles, California, pp. 331-338.

"Self-Tuning Technology in Microsoft SQL Server,", Surajit Chaudhuri, Eric Christensen, Goetz Graefe, Vivek Narasayya and Michael Zwilling, 1999, Bulletin of the Technical Committee on Data Engineering Journal, vol. 22 (2), pp. 20-27.

"The Episode File System", Sailesh Chutani, Owen T. Anderson, Michael L. Kazar, Bruce W. Leverett, W. Anthony Mason and Robert N. Sidebotham, 1992, Proc. 1992 Winter USENIX Conference, pp. 43-60.

"Common Internet File System (CIFS)", Mar. 26, 2001, Version: CIFS-Spec 0.9, Storage Networking Industry Association (SNIA), Draft SNIA CIFS Documentation Work Group Work-in-Progress, 126 pages.

"Storage Systems for National Information Assets", Robert A. Coyne, Harry Hulen and Richard Watson, Nov. 1992, IEEE Proc. Supercomputing 92, Minneapolis, pp. 626-633.

"Log Files: An Extended File Service Exploiting Write-Once Storage", Ross S. Finlayson and David R. Cheriton, Sep. 1987, Department of Computer Science, Stanford University, Report No. STAN-CS-87-1177, 14 pages.

"The Recovery Manager of the System R Database Manager", Jim Gray, Paul McJones, Mike Blasgen, Bruce Lindsay, Rayomond Lorie, Tom Price Franco Putzolu and Irving Traiger, Jun. 1981, ACM Computing Surveys, vol. 13 (2), pp. 223-242.

"Shadowed Management of Free Disk Pages with a Linked List", Matthew S. Hecht and John D. Gabbe, Dec. 1983, ACM Transactions on Database Systems, vol. 8 (4), pp. 503-514.

"TR3002 File System Design for an NFS File Server Appliance", Dave Hitz, James Lau and Michael Malcolm, 1995, Network Appliance, Sunnyvale, CA, USA, 9 pgs.

"Scale and Performance in a Distributed File System", John H. Howard, Michael L. Kazar, Sherri G. Menees, David A Nichols, M. Satyanarayanan, Robert N. Sidebotham and Michael J. West, Feb. 1988, ACM Transactions on Computer Systems, vol. 6 (1), pp. 51-81.

"An Overview of the Andrew File System", John H. Howard, 1988, Information Technology Center, Carnegie Mellon University, CMU-ITC-88-062, Abstract only, 1 page.

"Scale and Performance in a Distributed File System", John H. Howard, Michael L. Kazar, Sherri G. Menees, Daivd A Nichols, M. Satyanarayanan, Robert N. Sidebotham and Michael J. West, Aug. 5, 1987, Carnegie Mellon University, CMU-ITC-87-068, reprinted from the Internet at: http://reports-archive.adm.cs.cmu.edu/anon/itc/CMU-ITC-068.pdf, 33 pgs.

"Decorum File System Architectural Overview", Michael L. Kazar et al., 1990, USENIX Summer Conference, 13 pages.

"Synchronization and Caching Issues in the Andrew File System", Michael Leon Kazar, Jun. 1988, Carnegie Mellon University, CMU-ITC-88-063, 12 pages.

"Performance Tuning for SAP R/3", Alfons Kemper, Donald Kossmann and Benhard Zeller, Feb. 1999, Data Engineering Journal, vol. 22, pp. 33-40.

"Optimizing Shadow Recovery Algorithms", Jack Kent and Hector Garcia Molina, Feb. 1988, IEEE Transactions on Software Engineering, vol. 14, No. (2), pp. 155-168.

"Disconnected Operation in the Coda File System", James J. Kistler and M. Satyanarayanan, Feb. 1992, ACM Transactions on Computer Systems, vol. 10 (1), pp. 3-25.

(56) References Cited

OTHER PUBLICATIONS

"Physical Integrity in a Large Segmented Database", Raymond A. Lorie, Mar. 1977, ACM Transactions on Database Systems, vol. 2, No. 1, pp. 91-104.
"Beating the I/O Bottleneck: A Case for Log-Structured File Systems", John Ousterhout and Fred Douglis, Oct. 30, 1988, Technical Report, Computer Science Division, Electrical Engineering and Computer Sciences, University of California at Berkeley, 18 pages.
"A Case for Redundant Arrays of Inexpensive Disks (RAID)", David A. Patterson, Garth Gibson and Randy H. Katz, 1987, Technical Report, CSD-87-391, Computer Science Division, Electrical Engineering and Computer Sciences, University of California at Berkeley, 27 pages.
"A Case for Redundant Arrays of Inexpensive Disks (RAID)", David A. Patterson, Garth Gibson and Randy H. Katz, 1988, Computer Science Division, Dept. of Electrical Engineering and Computer Sciences, pp. 109-116.
"Data Placement for Copy-On-Write Using Virtual Contiguity", Zachary Nathaniel Joseph Peterson, Sep. 2002, University of California-Santa Cruz, Department of Computer Science, 68 pages.
"A Cached WORM File System", Sean Quinlan, 1991, Software-Practice and Experience, vol. 21 (12), pp. 1289-1299.
"The Design and Implementation of a Log-Structured File System", Mendel Rosenblum, 1992, In Proceedings of ACM Transactions on Computer Systems, Reprinted from the Internet at: https://www2.eecs.berkeley.edu/Pubs/TechRpts/1992/6267.html, 101 pgs.
"The Design and Implementation of a Log-Structured File System", Mendel Rosenblum and John K. Ousterhout, Jul. 1991, Proceedings of the 13th ACM Symposium on Operating Systems Principles and the Feb. 1992 ACM Transactions on Computer Systems, pp. 1-15.
"The LFS Storage Manager", Mendel Rosenblum and John K. Ousterhout, Jun. 1990, USENIX Technical Conference, Computer Science Division, Electrical Engin. and Computer Sciences, Anaheim, CA, presented at Summer '90 USENIX Technical Conference, (SUN00006851-SUN00006866), Jun. 1990, 16 pages.
"The Design and Implementation of a Log-Structured File System", Mendel Rosenblum and John K. Ousterhout, 1992, ACM Transactions on Computer Systems, vol. 10, No. 1, pp. 26-52.
"DB2 Universal Database Performance Tuning", Berni Schiefer and Gary Valentine, Feb. 1999, Data Engineering Journal, vol. 22 (2), pp. 12-19.
"Journaling Versus Soft Updates: Asynchronous Meta-Data Protection in File Systems", Margo I. Seltzer, Gregory R. Ganger, M. Kirk McKusick, Keith A. Smith, Craig A.N. Soules and Christoher A. Stein, Jun. 18-23, 2000, Proceedings of 2000 USENIX Annual Technical Conference, pp. 1-15.
"Tuning Time Series Queries in Finance: Case Studies and Recommendations", Dennis Shasha, Feb. 1999, Data Engineering Journal, vol. 22 (2), pp. 41-47.
"Volumes: The Andrew File System Data Structuring Primitive", Bob Sidemotham, 1986, EUUG Conference Proceedings Manchester, United Kingdom, pp. 1-8.
"Performance Challenges in Object-Relational DBMSs", Muralidhar Subramanian and Vishu Krishnamurthy, Feb. 1999, Data Engineering Journal, vol. 22 (2), pp. 28-32.
"Towards Self-Tuning Memory Management for Data Servers", Gerhard Weikum, Arnd Christian Konig, Achim Kraiss and Markus Sinwell, Feb. 1999, Data Engineering Journal, vol. 22 (2), pp. 3-11.
"The ITC Distributed File System: Prototype and Experience", Michael West, Davi Nicols, John Howard, M. Satyanaayanan and Robert Sidebotham, Mar. 1985, Carnegie-Mellon University, Technical Report, Reprinted from the Internet at: http://reports-archive.adm.cs.cmu.edu/anon/usr0/anon/itc/CMU-ITC-040.pdf, 17 pages.
"AFS-3 Programmer's Reference: Architectural Overview", Edward R. Zayas, Sep. 1991, Transarc Corporation, Pittsburgh, PA, Version 1.0, 91, 37 pages.

\* cited by examiner

| | 702 {| | | | |
|---|---|---|---|---|---|
| 704 — SOURCE INODE | INODE 120 | INODE 121 | INODE 122 | INODE 123 | INODE 124 |
| 706 — DESTINATION INODE | INODE 276 | INODE 278 | INODE 280 | INODE 284 | INODE 286 |
| 708 — SOURCE GENERATION | 3 | 2 | 3 | 1 | 2 |
| 710 — DESTINATION GENERATION | 3 | 3 | 3 | 1 | 2 |

MECHANISM FOR CONVERTING ONE TYPE OF MIRROR TO ANOTHER TYPE OF MIRROR ON A STORAGE SYSTEM WITHOUT TRANSFERRING DATA

CROSS-REFERENCE TO RELATED APPLICATIONS

This application claims priority to and is a continuation of U.S. application Ser. No. 12/950,281, filed on Nov. 19, 2010, which claims priority to U.S. application Ser. No. 11/854,309, filed on Sep. 12, 2007. Application Ser. No. 12/950,281 and Ser. No. 11/854,309 are incorporated herein by reference.

BACKGROUND OF THE INVENTION

Field of the Invention

This invention relates to storage of data and more particularly to mirroring or replication of stored data.

Background Information

A storage system is a processing system adapted to store and retrieve data on behalf of one or more client processing systems ("clients") in response to external input/output (I/O) requests received from clients. A storage system can provide clients with a file-level access to data stored in a set of mass storage devices, such as magnetic or optical storage devices or tapes. A storage system can also provide clients with a block-level access to stored data, or with both a file-level access and block-level access.

Data storage space has one or more storage "volumes" comprising physical storage devices, defining an overall logical arrangement of storage space. The devices within a volume are typically organized as one or more groups of Redundant Array of Independent (or Inexpensive) Devices (RAID).

To improve reliability and facilitate disaster recovery in the event of a failure of a storage system, its associated devices or some portion of the storage infrastructure, it is common to replicate some or all of the underlying data and/or the file system that organizes the data. In one example, a replicated copy is created and stored at a remote site, making it more likely that recovery is possible in the event of a disaster that may physically damage the main storage location or its infrastructure (e.g., a flood, power outage, etc). As used herein, the terms "source site" and "source storage system" are used interchangeably. Similarly, the terms "remote site", "destination site", and "destination storage system" are used interchangeably. Various mechanisms are used to create a copy of a dataset (such as a file system, a volume, a directory, or a file) at a remote site. One prior art solution stores a file system and data of the source storage system onto a media and restores the stored data at the destination site (this approach is known as "seeding"). As new data are written to a source, data stored at the destination storage system lags behind in time. Thus, the destination storage system needs to be periodically updated to reflect incremental updates to the source system (e.g., updates occurring over periodic time intervals). In order to maintain a current copy of the data at the destination site, several approaches have been advanced. According to one approach, known as a full-backup method, a file system and associated data at the source storage system are entirely recopied to a remote (destination) site over a network after a certain time interval. This approach, however, may be inconvenient in situations where the size of the file system is measured in tens or hundreds of gigabytes (even terabytes). This full-backup approach may severely tax the bandwidth of the network as well as processing capabilities of both destination and source storage system.

According to another approach, a file system and associated data at the destination site are incrementally updated to reflect the most recent changes. Dumping data to a tape or any other media, however, does not support incremental updates that are infinite (e.g., updates that have no limitations on a number). At some point, all data on a source storage system need to be recopied over to a media. In addition, to ensure that the file system and associated data at the destination site are consistent with the source, access to the file system has to be temporarily halted during the process of copying data. Furthermore, the copy of the data has to remain a "read-only" copy so that it cannot be modified by a user.

To address these challenges, new solutions have been advanced that are capable of doing incremental updates infinitely. One common form of updates involves the use of a "snapshot" process in which the active file system (e.g., a file system to which data can be both written and read) at the storage site is captured and the "snapshot" is transmitted as a whole, over a network to the remote storage site. A snapshot is a persistent point in time (PPT) image of the active file system that enables quick recovery of data after data has been corrupted, lost, or altered. Snapshots can be created by copying the data at each predetermined point in time to form a consistent image, or virtually, by using a pointer to form the image of the data. One of the products that establishes and maintains mirror relationship between a source system and a destination system and provides infinite updates to the destination storage system using snapshots is SnapMirror®, a product provided by Network Appliance, Inc., Sunnyvale, Calif. The copy is updated at regular intervals, typically set by an administrator, by sending incremental changes in the most current snapshot since a previously copied snapshot, in an effort to capture the most recent changes to the file system.

There are two known types of mirrors—a physical mirror and a logical mirror. As used herein, the term "mirror" refers to a copy or a replica of a dataset. In a physical mirror, a copy created at the destination storage system has a physical layout that matches the physical layout of the dataset stored at the source storage system (i.e., a destination dataset is stored at data blocks that have the same physical addresses as data blocks that store a source dataset). In a logical mirror, in contrast, a destination dataset can be stored at the destination storage system at different physical locations than the source dataset.

Currently, if a mirror of the data at the source storage system has already been created at a destination site using one technique for mirroring data, and the updates to the mirror at the destination storage system are performed using another technique for mirroring data, an existing mirror at the destination storage system has to be discarded and a new mirror needs to be created. This procedure presents several disadvantages. First, it incurs extra storage space since a new copy of the data at the destination storage system needs to be created while the existing copy already exists. In addition, deleting an existing copy presents disruption to a user. Furthermore, to create a new copy at the destination storage system, a large amount of data needs to be transmitted over the network, thereby burdening the network.

Accordingly, what is needed is a mechanism that supports conversion of one mirror relationship to another mirror relationship without burdening the network bandwidth and without presenting disruption to the user.

SUMMARY OF THE INVENTION

Embodiments of the present invention provide a system, method, and computer program product for converting an existing mirror relationship between an original dataset at a source storage system and a copy of the original dataset at a destination storage system to a new mirror relationship without discarding the existing copy of the original dataset, and thus, not creating a new copy of the original dataset at the destination storage system. Advantageously, the present invention does not incur extra storage space since the dataset at the destination storage system (also referred to herein as a destination dataset) is not discarded when a new mirror relationship is created. Furthermore, no disruption is presented to a user. In addition, by not transferring data from the source storage system to the destination storage system, the present invention does not burden the network with an extra traffic. Notably, the present invention can convert a physical mirror to a logical mirror or a logical mirror to another logical mirror without causing disruption to a user.

As used herein, "converting one mirror relationship to a new mirror relationship" refers to a process by which a physical mirror is converted to a logical mirror, or a logical mirror created using one technique is converted to a logical mirror that will be updated using a different technique.

According to an embodiment of the present invention, a directory structure of a file system (containing file and directory attributes) at the source storage system is transferred to the destination storage system. A directory can be transferred at any time as desired by a user. For example, the transfer may take place during off-peak hours when less workload at the storage system is expected. Alternatively, the transfer can take place at any time. As used herein, the word "file" encompasses a container, an object, or any other storage entity. The destination storage system, in turn, compares the received directory and file attributes to the directory and file attributes at the destination storage system. If a matching file attribute is found, a data structure is created that maps an identifier of the file at the source storage system to an identifier of a file having a matching attribute at the destination storage system. As a result, subsequent updates to the destination storage system can be done using a mirroring technique (which may support a logical mirror) other than the one that was used to create the existing mirror of the original dataset. As used herein, attributes may refer to file names, as well as other properties of a file.

Furthermore, the present invention can be implemented in a Storage Area Network (SAN) environment in which clients access data using block-based access requests, and clients see data as one or more logical units rather than a collection of files. According to this embodiment, rather than transferring attributes of files and directories to the destination storage system, an attribute of a logical unit(s) is transferred. The destination storage system compares the transferred attribute of a logical unit (LU) to an attribute of a logical unit at the destination storage system and creates a mapping between the attributes of the matching logical units. The mapping can be stored in a data structure at the destination storage system. Advantageously, a logical unit that was originally created at the destination storage system does not need to be disconnected from the destination system. As a result, no data is transferred over the network.

Furthermore, a novel technique of the present invention is not limited by mirroring data remotely. In contrast, the technique is applicable to creating a new type of mirror between one or two volumes that stores data for the source storage system.

Other aspects of the invention will become apparent from the following detailed description taken in conjunction with the accompanying drawings, which illustrate the principles of the invention by way of example.

BRIEF DESCRIPTION OF THE DRAWINGS

The invention description below refers to the accompanying drawings, of which:

FIG. 7 is an exemplary inode map according to an embodiment of the present invention;

DETAILED DESCRIPTION OF AN ILLUSTRATIVE EMBODIMENT

Network and Storage System Environment

Figure 1:
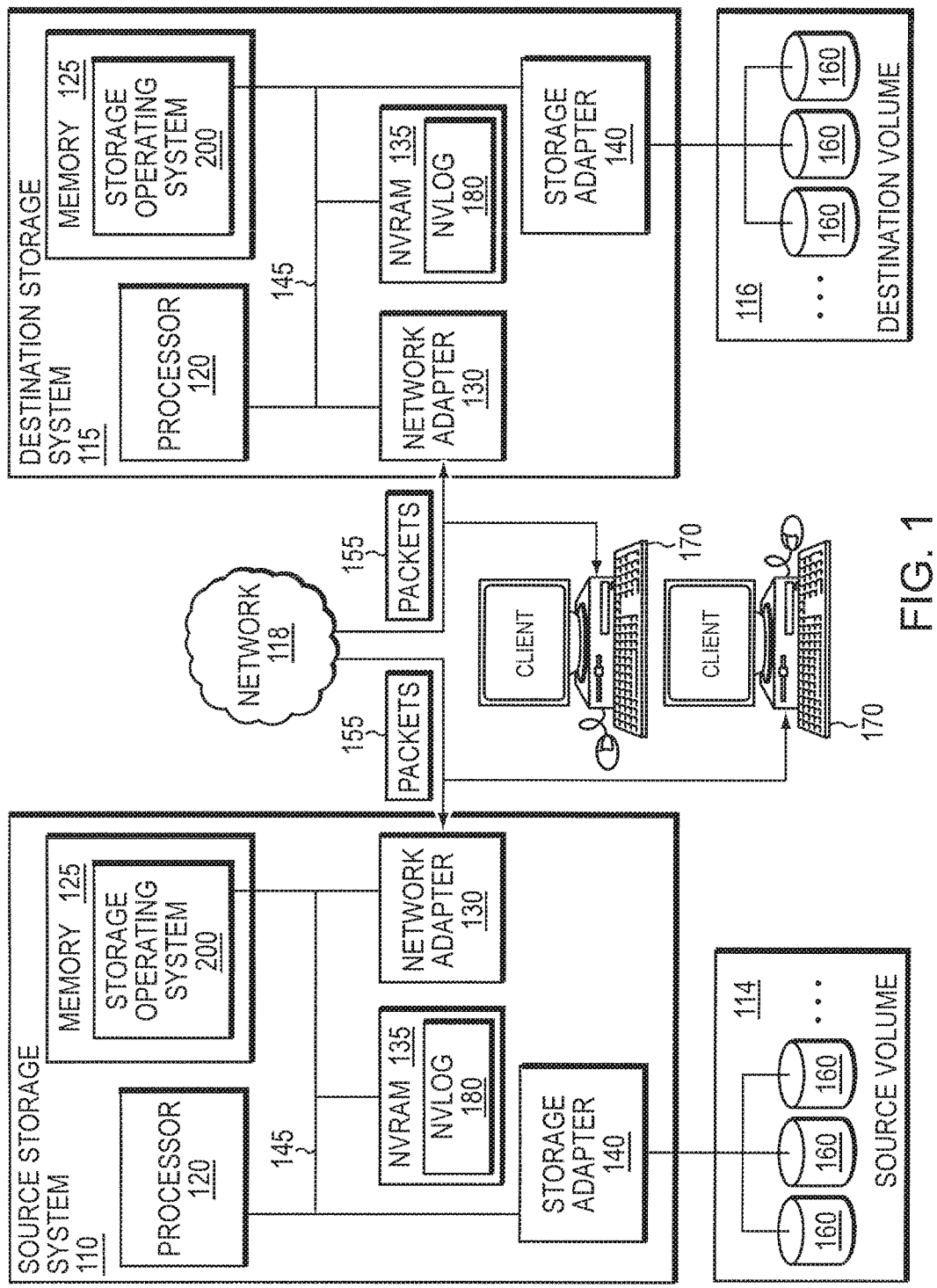
FIG. 1 is a schematic block diagram of a source storage system and a destination storage system.

FIG. 1 is a schematic block diagram of a storage system environment that includes a pair of interconnected storage systems including a source storage system 110 and a destination storage system 112 that may be advantageously used with the present invention. For the purposes of this description, the source storage system 110 is a device that manages storage of one or more source volumes 114, each having an array of storage devices 160 (described further below). The destination storage system 112 manages one or more destination volumes 116, which, in turn, comprise arrays of storage devices 160 (such as disks). The source and destination storage systems are connected via a network 118 that can comprise a local or wide area network. For the purposes of this description, like components in each of the source and destination storage system, 110 and 112, respectively, are described with like reference numerals. As used herein, the term "source" can be broadly defined as a location from which data travels and the term "destination" can be defined as the location to which the data travels. Those of skill in the art would understand that although the present invention will be described in the context of creating a new mirror relationship at the destination storage system that is remotely located from the source storage system, in other embodiments, the new mirror relationship is created between one or more volumes that store data for the source storage system. As such, a volume that stores an original dataset is a source volume and a volume that stores a copy of the original dataset is a destination volume.

According to an embodiment of the present invention, in order to improve reliability and facilitate disaster recovery in the event of a failure of the source storage system 110, its associated storage devices or some portion of the storage infrastructure are mirrored at the destination storage system 112. A dataset is a set of data. Examples of datasets include, e.g., a file system, a volume, a directory, or a file. The term "mirroring" refers to the process of creating a copy or a replica of a dataset. The original dataset is also called a "source dataset" with respect to the mirror. The mirror at the destination storage system could have been created using several known mechanisms, such as a Network Data Management Protocol (NDMP) (an open standard protocol for enterprise-wide backup of heterogeneous network-attached storage), a Robocopy protocol, a VolCopy command provided by Network Appliance of Sunnyvale, Calif., or a SnapMirror® application. Mirroring or replication of stored data in remote storage locations over a network is described in detail in a commonly-owned U.S. patent application Ser. No. 10/100,950, entitled "System and Method For Asynchronous Mirroring of Snapshots At a Destination using a Purgatory Directory and inode Mapping," by Stephen L. Manley, et al., which disclosure is incorporated by reference herein.

Conventionally, to convert an existing mirror relationship to a new mirror relationship between a source dataset stored at the source storage system and a destination dataset stored at the destination storage system, the existing relationship would have to be discarded (by deleting a mirror at a destination storage system) and a new copy of a dataset needs to be created at the destination storage system. As described herein, this, in turn, incurs extra storage space and processing since there is a need to recreate the source data at the destination. In addition, since data from the source storage system needs to be transferred to the destination storage system, the transfer uses network bandwidth. According to an embodiment of the present invention, an existing mirror relationship is converted to a new mirror relationship without discarding an existing copy at the destination storage system. This, in turn, eliminates the need to create a new copy of a dataset at the destination storage system, and thus to transfer large amount of data over the network. As will be described in greater detail herein, according to an embodiment of the present invention, rather than creating a new copy of the active file system at the destination storage system, the present invention transfers a directory structure (such as directory and file attributes) to the destination storage system. The destination storage system compares the directory and file attributes to directory and file attributes of the active file system at the destination storage system. If a matching file attribute is found at the destination file system, a mapping is created between the inode number of the source file and the inode number of the destination file whose attributes match to create a new relationship that can be used instead of the prior relationship. The mapping is stored at the destination storage system for later use. An inode is a data structure persistent on a storage device that stores information about a file, such as ownership of the file, access permission for the file, size of the file, name of the file, location of the file, as well as other attributes of a file. Future updates to the destination storage system can be done using a mirroring technique other than the one that was used to create a mirror relationship in the first place, yet the existing copy at the destination storage system need not be discarded and can be used to provide subsequent updates. A person of ordinary skill in the art would understand that although the present invention can be implemented in the context of transferring directories and file names, other attributes of files can be used to implement the present invention. Furthermore, the present invention can be implemented in a SAN environment so that attributes of directories and logical units are transferred to the destination storage system.

Still referring to FIG. 1, storage systems 110 and 112 can be any type of special-purpose computer (e.g., server) or general-purpose computer, including a standalone computer. The source and destination storage systems 110, 112 each comprise a processor 120, a memory 125, a network adapter 130 and a storage adapter 140 interconnected by a system bus 145. Each storage system 110, 112 also include a storage operating system 200 (shown in more detail in FIG. 2) that implements a file system to logically organize the information as a hierarchical structure of directories and files on storage devices.

It will be understood to those skilled in the art that the inventive technique described herein may apply to any type of special-purpose computer or general-purpose computer, including a standalone computer, embodied as a storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 125 comprises storage locations that are addressable by the processor and adapters for storing software program code. The memory can be a random access memory (RAM). The processor and adapters may, in turn, comprise processing elements and/or logic circuitry configured to execute the software code and manipulate the data structures stored in memory. The operating system 200, portions of which are typically resident in memory, functionally organizes the storage system by, inter alia, invoking storage operations in support of a file service implemented by the storage system. It will be apparent to those skilled in the art that other processing and memory means, including various computer readable media, may be used for storing and executing program instructions pertaining to the inventive technique described herein.

The network adapter 130 comprises the mechanical, electrical and signaling circuitry needed to connect each storage system 110, 112 to the network 118, which may comprise a point-to-point connection or a shared medium, such as a local area network.

The storage adapter 140 cooperates with the operating system 200 executing on the storage system to access information requested by the client (such as client 170). The information may be stored on the storage devices 160 that are attached, via the storage adapter 140 to each storage system 110, 112 or other node of a storage system as defined herein.

Each storage system 110 and 112 may also be interconnected with one or more clients 170 via the network adapter 130. The clients transmit requests for data to the source and destination storage systems 110, 112, respectively, and receive responses to the requests over a LAN or other network (e.g., 118). Data is transferred between the client and the respective storage system 110, 112 using data packets 155 defined as an encapsulation of the Common Internet File System (CIFS) protocol or another appropriate protocol such as Network File System (NFS) protocol.

In one exemplary implementation, each storage system 110, 112 can include a nonvolatile random access memory (NVRAM) 135 that provides fault-tolerant backup of data, enabling the integrity of storage system transactions to survive a service interruption based upon a power failure, or other fault. The size of the NVRAM depends in part upon its implementation and function in the storage system. It is typically sized sufficiently to log a certain time-based chunk of transactions.

In an illustrative embodiment, the storage devices 160 are arranged into a plurality of volumes (for example, source volumes 114 and destination volumes 116), in which each volume has a file system associated therewith. The volumes each include one or more devices 160. In one embodiment, storage devices 160 are configured into RAID groups so that some devices store striped data and some devices store separate parity for the data, in accordance with a preferred RAID-4 configuration. However, other configurations (e.g. RAID-5 having distributed parity across stripes, or RAID-DP) are also contemplated.

B. Storage Operating System

Figure 2:
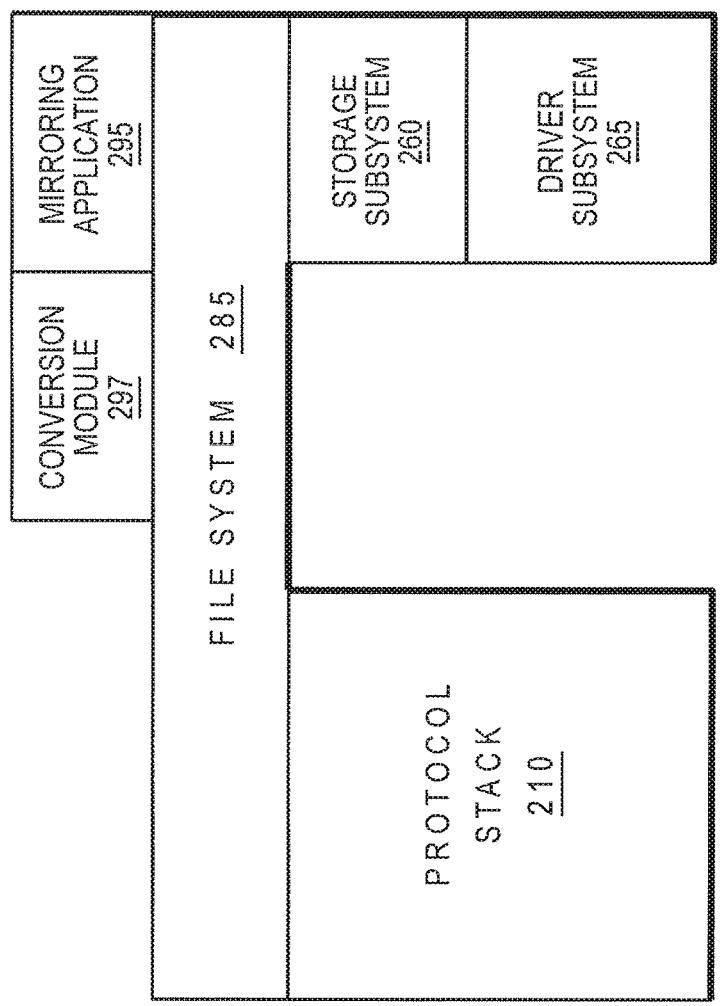
FIG. 2 is a schematic block diagram of an exemplary storage operating system for use with the storage system of FIG. 1.
Figure 6A:
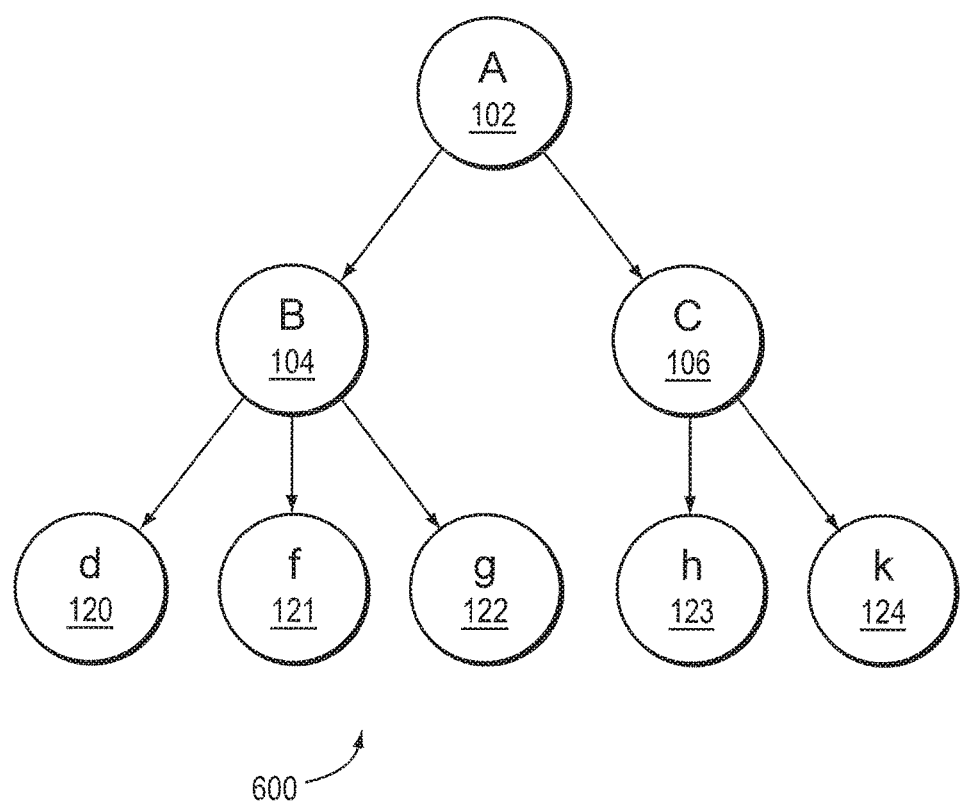
FIG. 6A is an exemplary file system directory structure of a snapshot at the source storage system shown in FIG. 1.
Figure 6B:
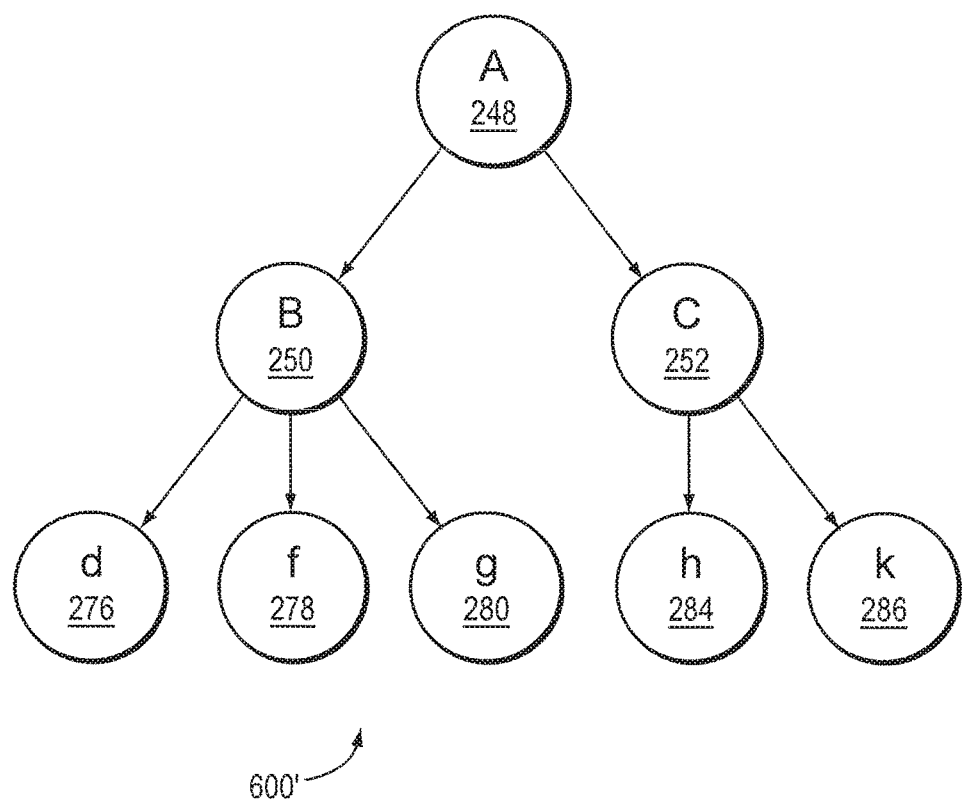
FIG. 6B is an exemplary file system directory structure of an active file system at the destination storage system shown in FIG. 1.

Referring now to FIG. 2, to facilitate generalized access to the storage devices 160, the storage operating system 200 (FIG. 2) implements a write-anywhere file system 285 that logically organizes the information as a hierarchical structure of directories and files on the storage devices (such as the one shown in FIGS. 6A and 6B and described in more detail herein). Each file may be implemented as a set of blocks configured to store information, such as data, whereas the directory may be implemented as a specially formatted file in which references to other files and directories are stored. The storage operating system can be NetApp® Data ONTAP™ operating system available from Network Appliance, Inc., of Sunnyvale, Calif., that implements the Write Anywhere File Layout (WAFL™) file system. Those skilled in the art, however, would understand that any appropriate file system that is otherwise adaptable to the teachings of this invention can be used. As used herein, the term "storage operating system" generally refers to the computer-executable code operable on a computer to perform a storage function that manages data access and may, in the case of a storage system 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

Generally, file system 285 has format representation that is block-based (e.g., 4-kilobyte (KB) data blocks). Inodes can be used to describe the files. When servicing client requests for data, the file system generates operations to load (retrieve) the requested data from devices 160 if data are not resident in the storage system's memory. If the data are not in memory, the file system layer 285 indexes into the inode file (shown in FIG. 3) using the inode number to access an appropriate entry and retrieve a volume block number. The file system 285 then passes the volume block number to a storage (RAID) subsystem 260, which maps that volume block number to a device block number and sends the latter to an appropriate driver (for example, an encapsulation of SCSI implemented on a fibre channel device interconnection) of a driver subsystem 265. The driver subsystem 265 accesses the block number from volumes and loads the requested data in memory 125 for processing by the storage system 110, 112. Upon completion of the request, the storage system (and storage operating system) returns a reply, to the client 170.

It should be noted that the software "path" through the storage operating system layers described above needed to perform data storage access for the client request received at the storage system may alternatively be implemented in hardware or a combination of hardware and software.

The storage operating system 200 comprises a series of software layers, including a network driver layer (e.g., an Ethernet driver), a network protocol layer (e.g., an Internet Protocol layer and its supporting transport mechanisms, the Transport Control Protocol layer and the User Datagram Protocol layer), as well as a file system protocol server layer (e.g., a CIFS server, a NFS server, etc.) organized as a network protocol stack 210. The storage subsystem 260 that implements a storage protocol, such as a RAID protocol, and the driver subsystem 265 implements a control protocol such as the small computer system interface (SCSI).

Figure 3:
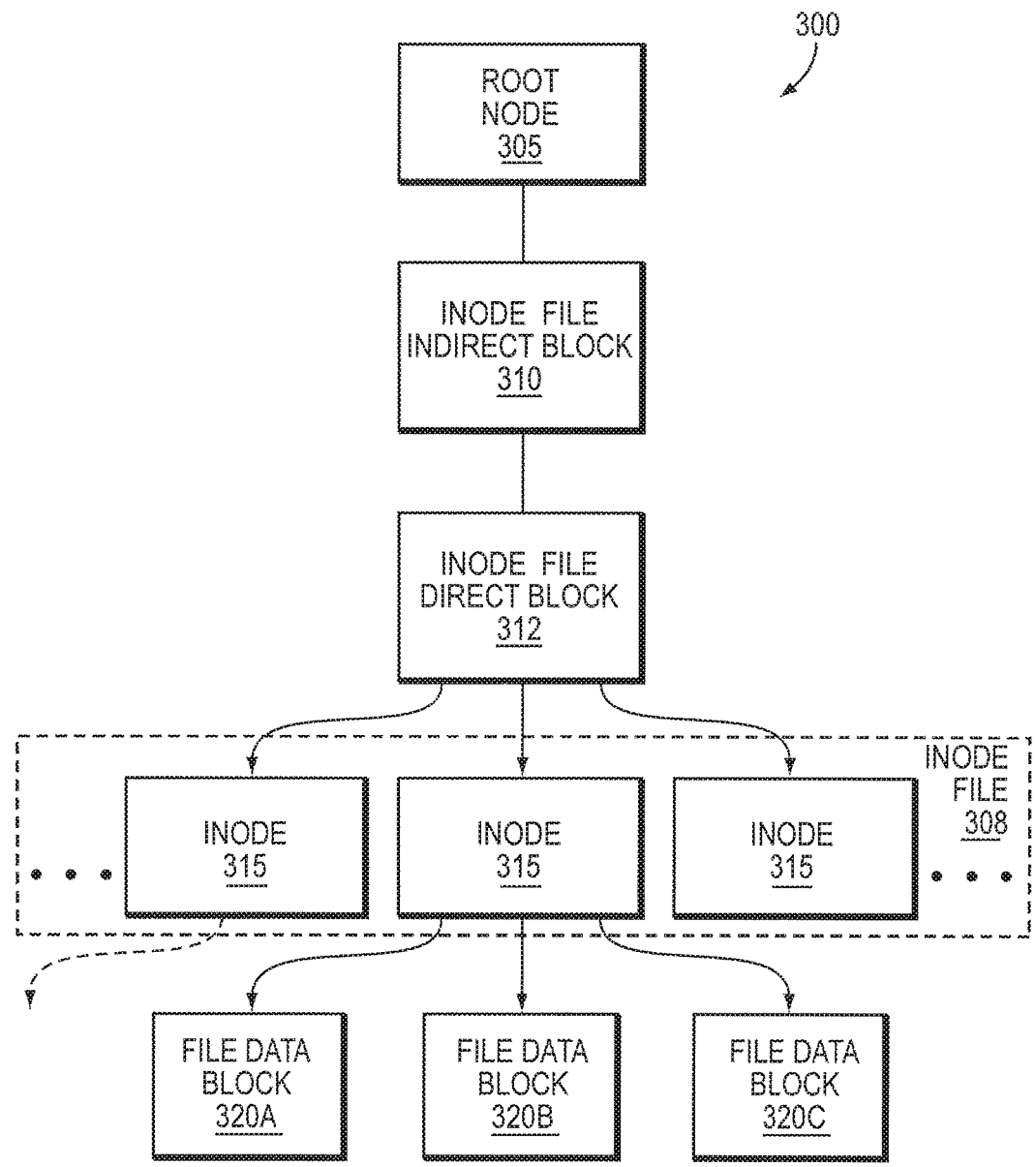
FIG. 3 is a schematic block diagram of an exemplary file system inode structure.

Referring now to FIG. 3, an exemplary file system inode structure 300 according to an illustrative embodiment is shown in FIG. 3. The inode for the inode file or more generally, the "root" inode 305 contains information describing the inode file 308 associated with a given file system. In this exemplary file system, inode structure root inode 305 contains a pointer to the inode file indirect block 310. The inode file indirect block 310 points to one or more inode file direct blocks 312, each containing a set of pointers to modes 315 that make up the inode file 308. The depicted subject inode file 308 is organized into volume blocks (not separately shown) made up of inodes 315, which, in turn, contain pointers to file data blocks 320A, 320B and 320C. Each of the file data blocks 320(A-C) is adapted to store, in the illustrative embodiment, 4 kilobytes (KB) of data.

Figure 4:
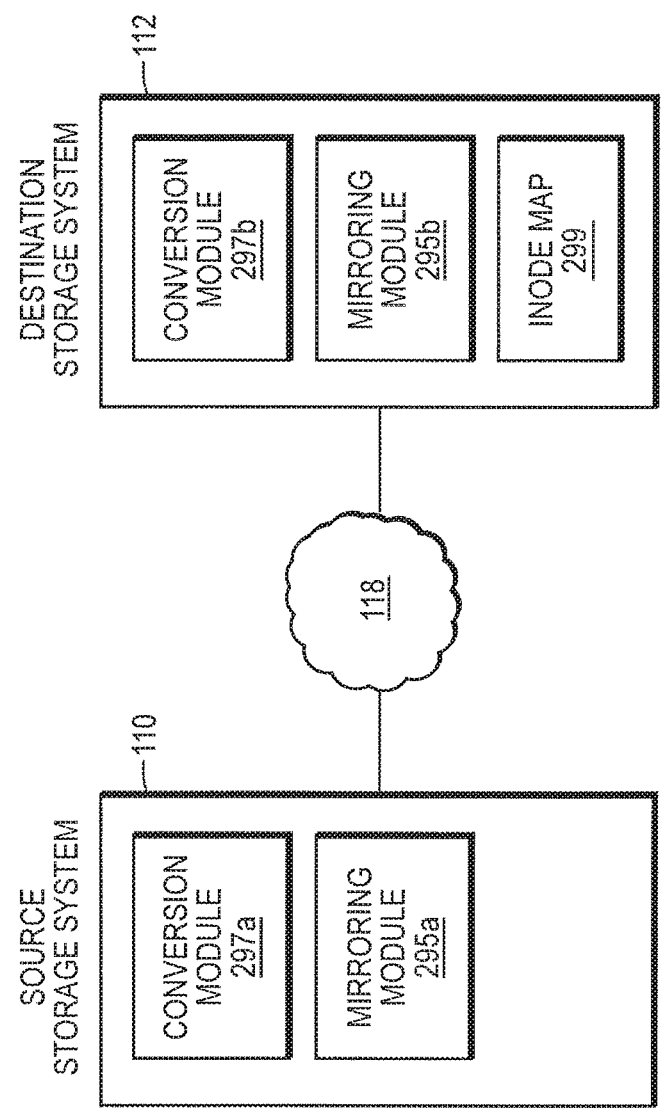
FIG. 4 is a schematic block diagram of the components executed at the source storage system and the destination storage system shown in FIG. 1 to implement the present invention.

Referring again to FIG. 2, overlying the file system layer 285 is a conversion module 297 in accordance with an illustrative embodiment of the present invention. Components of the conversion module 297 are implemented at the source storage system 110 and the destination storage system 112. For purposes of the present invention, components of the conversion module at the source storage system 110 are designated as conversion module 297a, and components of the conversion module at the destination storage system 112 are designated as conversion module 297b (these components are shown in FIG. 4). Briefly, as part of the process for converting an existing mirror relationship between a source dataset and a destination dataset to a new mirror relationship, conversion module 297a at the source storage system 110 is responsible for traversing a file directory structure of a snapshot of the active file system, identifying directories and files, and transferring attributes of the directories and files to conversion module 297b at the destination storage system 112. Conversion module 297b at the destination storage system 112, in turn, receives directory and file attributes from the source storage system and compares the attributes to the directory and file attributes at the destination storage system. For each matched entry, conversion module 297b creates a mapping between the matched attributes of files and/or directories using inode numbers identifying files and directories. Once the map (such as inode map 299 shown in FIG. 4 and FIG. 7) is built between file and directory structure at the source storage system and the file and directory structure at the destination storage system, future updates to the data at the source storage system 110 can be provided at the destination system using the map.

The mirroring (or replication) application 295 (also referred to herein as "mirroring module") in accordance with an illustrative embodiment of this invention is responsible for updating a destination dataset (or a mirror) at the destination storage system 112. Components of the mirroring module 295 are executed both at the source storage system 110 and destination storage system 112. For purposes of the present invention, components of the mirroring module 295 executed at the source storage system 110 are designated as mirroring module 295a. Components of the mirroring module 295 executed at the destination storage system 110 are designated as mirroring module 295b. Mirroring module 295a is responsible (on the source side) for identifying changes between a base snapshot (the most recent snapshot transferred successfully) and a current snapshot of the source file system and transferring the changes to the destination storage system 112 over the network. Notably, according to an embodiment of the present invention, the updates to the source storage system 110 can be mirrored at the destination storage system using a technique other than the one that was used to create the existing mirror, without discarding the existing mirror at the destination storage system 112. The mirroring module 295b at the destination storage system 112 is responsible for updating a dataset at the destination storage system 112. A mechanism for performing incremental updates at the destination storage system after the existing mirror relationship has been converted to a new mirror relationship will be described in greater detail in reference to FIG. 8.

Referring now to FIG. 6A, it illustrates an exemplary hierarchical structure 600 of linked nodes which represent directories and files of a base snapshot created at the source storage system 110. Those skilled in the art would understand that other structures can be used. In this structure, nodes A, B, and. C represent directories. Nodes "d", "f" and "g" are files within directory B, nodes "h" and "k" are files within directory C. The topmost node in this structure is node A (root node). The remaining nodes are child nodes of node A. Nodes d, f, g, h, and k are called leaf nodes since neither of these nodes has a child. Each node corresponding to a file has an inode number associated with that file.

Figure 5:
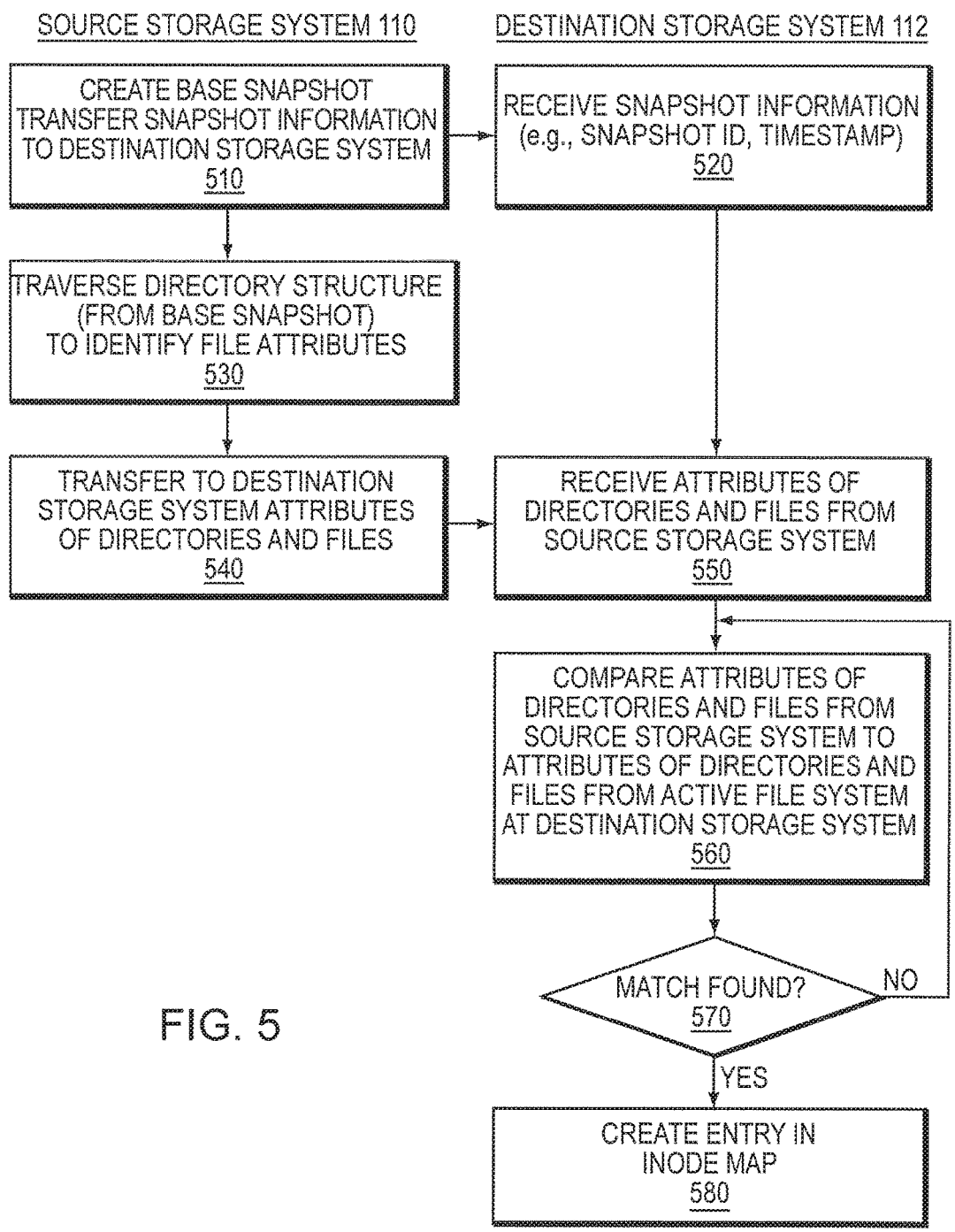
FIG. 5 is an event diagram of a method for converting one mirror relationship to another mirror relationship according to an embodiment of the present invention.

Referring now to FIG. 5, it illustrates various communications between conversion module 297a and conversion module 297b to implement mechanism for converting an existing mirror relationship between a source dataset and a destination dataset to a new mirror relationship. An embodiment of the present invention provides for conversion of a physical mirror to a logical mirror and/or for conversion of one logical mirror to another logical mirror. As previously described, in a logical mirror type relationship, a destination dataset is independent of a physical layout of the source dataset. That is, the destination dataset can be stored at the destination storage system at a different physical location on storage devices connected to the destination storage system 112 than the original dataset stored on the device connected to the source storage system 110. As a result, relationship between the source dataset and destination dataset can be established by a logical mapping. In a physical mirror type relationship, in contrast, the source dataset is stored at the same physical address at the source storage system 110 as the mirror at the destination storage system 112 so that access can be had to both datasets using the same physical addresses.

Initially, at step 510, mirroring module 295a creates a base snapshot of the active file system at the source storage system 110. The process of creating snapshots is described in U.S. patent application Ser. No. 10/090,963, entitled "System and Method for Creating a Point-in-time Restoration of Database File," by Dennis Chapman, the contents of which are incorporated by reference herein.

Mirroring module 295a then transfers snapshot information related to the created base snapshot. The information may include, for example, a snapshot identification (ID), a timestamp indicating when the snapshot was created, as well as other information related to the created snapshot. Mirroring module 295b at the destination storage system 112 receives 520 the snapshot information and optionally stores it in memory, e.g., memory 125, at the destination storage system 112.

At step 530, conversion module 297a traverses a directory structure (such as data structure 600 shown in FIG. 6A) to identify directory and file attributes from the base snapshot. According to an embodiment of the present invention, conversion module 297a visits each node in the structure (i.e., traverses the structure) to identify nodes that represent directories and places these nodes into a processing queue. Various algorithms can be used to traverse a hierarchical structure to identify nodes that represent directories. These algorithms can differ in the order in which the nodes are visited. In one implementation, a breadth-first search (BFS) algorithm is used to traverse the data structure. Briefly, using this method, the traversal of the structure begins at the root and explores all the neighboring nodes. A neighboring node is a node that is connected to a node that is being traversed. Then for each of those nearest nodes, it explores their unexplored neighbor nodes, and so on, until there are no more nodes in the structure. The following steps describe the BFS algorithm as used in the present invention to traverse directory structure 600 shown in FIG. 6A:

1. Put the root node in the queue (e.g., node A);
2. Pull a node from the beginning of the queue and examine it (e.g., node A);
3. If the node is a directory node and there are no more nodes in the structure, stop the traversal;
4. Otherwise push all the (so-far-unexamined) successors of this node (e.g., nodes B and C) into the end of the queue, if there are any;
5. If the queue is empty, every node in structure has been examined—discontinue the search and return "not found";
6. Repeat from Step 2.

As a result of traversing structure 600 using the BFS algorithm, the queue will include the following directory nodes: A, B, and C. According to other embodiments, the traversal of the structure can be performed using a depth-first-search (DES) algorithm. A person of ordinary skill in the art would understand that other algorithms that produce similar results can be used to traverse a hierarchical data structure.

After performing the search, conversion module 297a identifies attributes of files for each directory node and transfers the file attributes (at step 540) to the destination storage system 112. In one implementation, the attributes are transferred using, for example, a known logical replication protocol (LREP). Notably, the transfer can take place at any time as desired by a user. For example, the transfer may take place during off-peak hours when less workload at the storage system is expected. Alternatively, the transfer can take place at any other time.

Using an exemplary directory structure in FIG. 6A, conversion module 297a transfers to the destination storage system attributes for the following files and directories:

Directory B: file d, file f, file g;
Directory C: file h, file k.

Other properties of the file can also be transferred to the destination storage system 112. These properties may include inode numbers of files and directories, an extension of the inode, which indicates a version of the file, a timestamp indicating when a file was created, as well as other attributes.

Still referring to FIG. 5, conversion module 297b at the destination storage system 112 receives attributes of files and directories, at step 550. Optionally, conversion module 297b stores the received file attributes in a temporary file in memory (such as memory 125) at the destination storage system 112. In one exemplary embodiment, transferred attributes are added to a hash table in memory. Those skilled in the art would understand that other data structures can be used. Each entry in the hash table, thus, represents a transferred directory or file attribute. Those of skill in the art would understand that a hash table is one exemplary mechanism for implementing the present invention, and other techniques that produce similar results can be used.

Conversion module 297b traverses the hash table and compares each entry corresponding to the transferred directory or file attribute to file and directory attributes in a directory structure of the active file system at the destination storage system 112 (step 560). Such an exemplary hierarchical structure 600' of directories and files in the active file system of the destination storage system 112 in shown in FIG. 6B. In this structure, nodes A, B, and C represent directories. Nodes "d", "f" and "g" are files within directory B, nodes "h" and "k" are files within directory C. The topmost node in this structure is node A (a root node). The remaining nodes are child nodes of node A. Nodes d, f, g, h, and k are called leaf nodes since neither of these nodes has a child. Each node corresponding to a file has an inode number associated with that file. As illustrated in FIGS. 6A and 6B, although both figures depict the same file attributes and directories, inode numbers that correspond to the files at the source storage system 110 (in FIG. 6A) are different from those corresponding to the files at the destination storage system (in FIG. 6B).

In one exemplary embodiment, the conversion module 297b starts traversing the directory structure at the root of the active file system at the destination storage system 112, and loads all the file and directory attributes to memory 125. If a match is found for an attribute in the hash table (at step 570), conversion module 297b removes the attribute of the file or directory from the table and adds inodes of the matched file attributes to the inode map created at the destination storage system 112 (step 580). An exemplary inode map that maps inode numbers of the source files and directories and destination files and directories is shown in FIG. 7. The inode map can be stored on storage devices 160 at the destination storage system 112.

Referring now to FIG. 7, an inode map (such as inode map 299) is established in the destination storage system 112. The inode map 299 comprises a plurality of entries. Each entry 702 includes a source inode number 704 (corresponding to the file from the source storage system) and a destination inode number 706 (corresponding to the file from the destination storage system). In addition, an entry 702 may include a source generation number 708, which represents a version of the file having the source inode number. Entry 702 may also include a destination generation number 710, which represents a version of the file having the destination inode number.

As matching file and directory attributes are found at the destination storage system, the inode map is populated with -node numbers corresponding to the matching attributes. As will be described in more detail below, once the map is built, future updates to the source storage system 110 can be made using the -node map without creating a new copy of the source dataset. As previously described, known techniques for creating a new mirror relationship between a source dataset and a destination involve transferring actual file data, such as 4 KB data blocks, to the destination storage system, and discarding an existing destination dataset. By transferring attributes of the files and directories from the source storage system 110 to the destination storage system 112 and comparing the transferred attributes to the directory and file attributes maintained at the destination storage system 112, the present invention avoids transferring large amounts of data over the network when the data is already present at the destination storage system 112.

Still referring to FIG. 5, if a matching attribute is not found, it indicates that the file was deleted from the active file system at the destination storage system 112. In this situation, conversion module 297b requests conversion module 297a to transfer those files. Once the mapping between inodes is created, conversion module 297b indicates at the destination storage system that a logical mirror was created. The logical mirror is marked as a "read-only."

Inode Matching

According to another implementation, instead of creating an inode map, conversion module 297b at the destination storage system 112, matches inodes on a destination storage system 112 to modes at the source storage system 110. Referring again to FIGS. 6A and 6B to illustrate this embodiment. According to this embodiment, inode numbers at the destination storage system (such as inode numbers "248", "250", "252", "276", "278", "280". "284", and "286") are changed to match inode numbers associated with the matching files and directories at the source storage system 110 (such as inode numbers "102", "104", "106", "120", "121", "122", "123", and "124"). To this end, when a matching file attribute is found at the destination storage system 112, conversion module 297b copies the inode corresponding to the matching file, to a new location identified by the inode number of the file at the source storage system 110. A directory entry is also changed to indicate that the inode number has changed. As a result, matching file attributes at the destination storage system 112 will have the same inode numbers as their matching counterparts at the source storage system 110.

Figure 8:
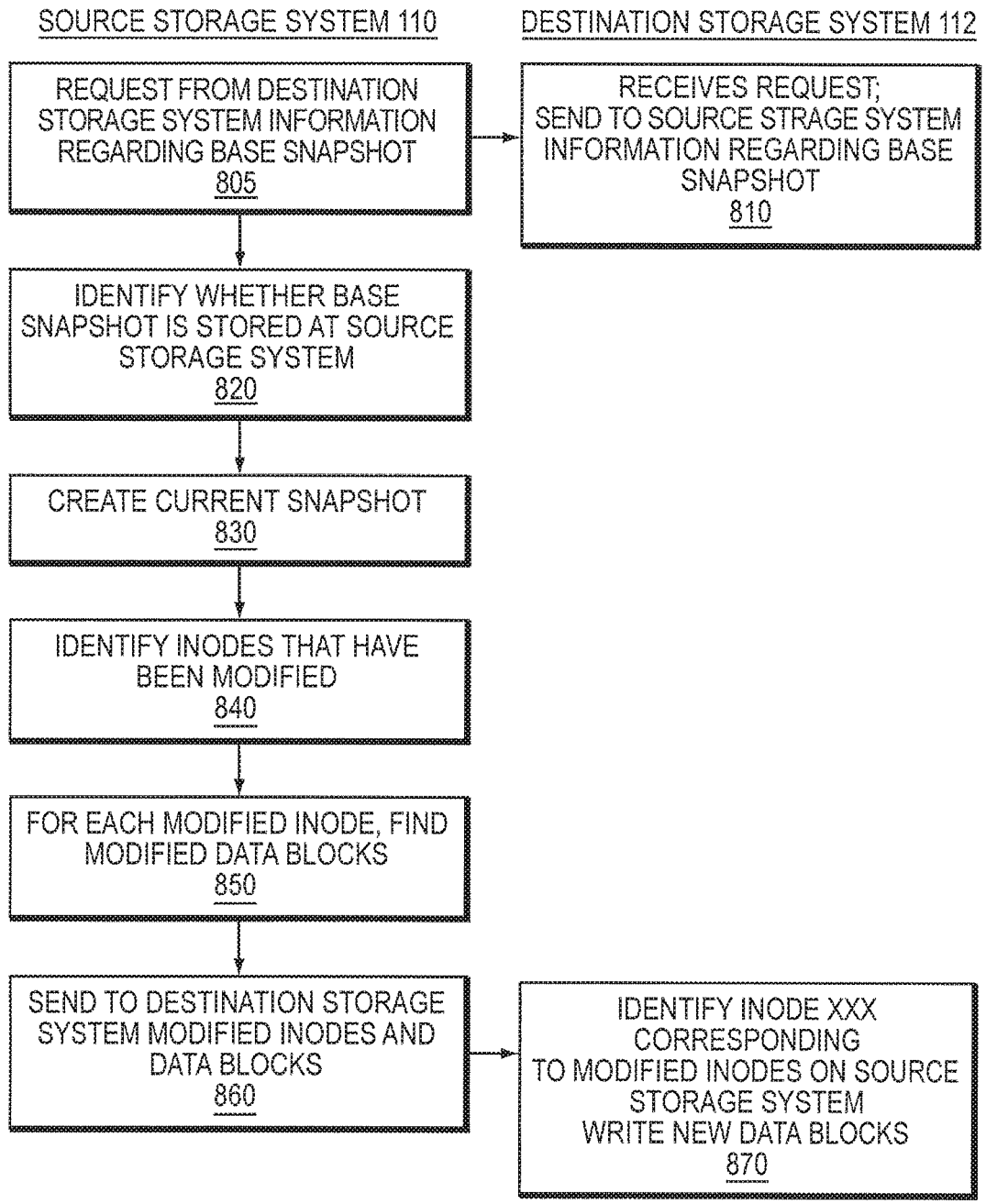
FIG. 8 is an event diagram of a method for performing incremental updates at the destination storage system shown in FIGS. 1 and 4 according to an embodiment of the present invention.

Referring now to FIG. 8, it describes communications between the source storage system 110 and the destination storage system 112 to replicate updates occurring at the source storage system, to the destination storage system, after a new mirror relationship has been created.

Initially, the source storage system 110 requests, from the destination storage system 112, information regarding the base snapshot (step 805). Mirroring module 295b at the destination storage system 112 provides, to the source storage system 110, the requested information (such as a snapshot ID, a timestamp indicating when the snapshot was created, as well as other data related to the base snapshot) (at step 810).

Mirroring module 295a at source storage system 110 uses the received. information to determine whether the base snapshot is stored at the source storage system 110 (step 820). In one implementation, to this end, mirroring module 295a uses a snapshot ID to find the snapshot identified by the snapshot ID. At step 830, a current snapshot is created.

Mirroring module 295a then identifies inodes that have changed since the base snapshot was created using, for example, an inode structure (such as the one shown in FIG. 3) (step 840). As described herein, an inode stores information about a file, such as ownership of the file, access permission for the file, size of the file, name of the file, location of the file, a timestamp indicating when a file was created, etc. In one implementation, mirroring module 295a identifies changes in the inode by comparing the timestamp of the current snapshot and the timestamp of the base snapshot. If the two timestamps do not match, it indicates that the inode has changed since the base snapshot was created. Mirroring module 295a puts all modified inodes into a queue and identifies data blocks (such as data blocks 320 shown in FIG. 3) corresponding to modified inodes (step 850). Mirroring module 295a then sends, to destination storage system 112, inode numbers for modified modes as well as data blocks corresponding to the modified modes (step 860).

Mirroring module 295b at destination storage system 112 receives source inode numbers and data blocks, and uses the inode map to identify destination inode numbers mapped to the source inode numbers. Then, new data blocks are written to the destination storage system 112 as part of the process for updating destination dataset at the destination storage system (step 870).

SAN Implementation

In a storage system that supports a Storage Area Network (SAN)-based network environment, clients usually access data at a storage system using block-based access protocols, such as the Small Computer Systems Interface (SCSI) protocol. Clients 170 see data as one or more logical units (LU) identified by a logical unit number, rather than a collection of files. When a commercially available application is used to create a copy of a LU at the destination storage system 112, client system (such as client 170) connected to both the source storage system and destination storage system 112 performs the replication. Conventionally, to convert an existing relationship between the source and destination storage systems, the copied LU would have to be disconnected from the destination storage system 112, and the LU at the source storage system would have to be copied again to the destination storage system 112 using the new relationship. Thus, conventional techniques require transfer of large amounts of data over the network and significant processor use to create a new copy of the LU at the destination storage system 112.

According to an embodiment of the present invention, conversion of an existing mirror relationship between the source storage system and destination storage system, to a new relationship can be done without disconnecting the existing copy of the LU. Such a conversion mechanism is described in greater detail in reference to FIG. 9.

Figure 9:
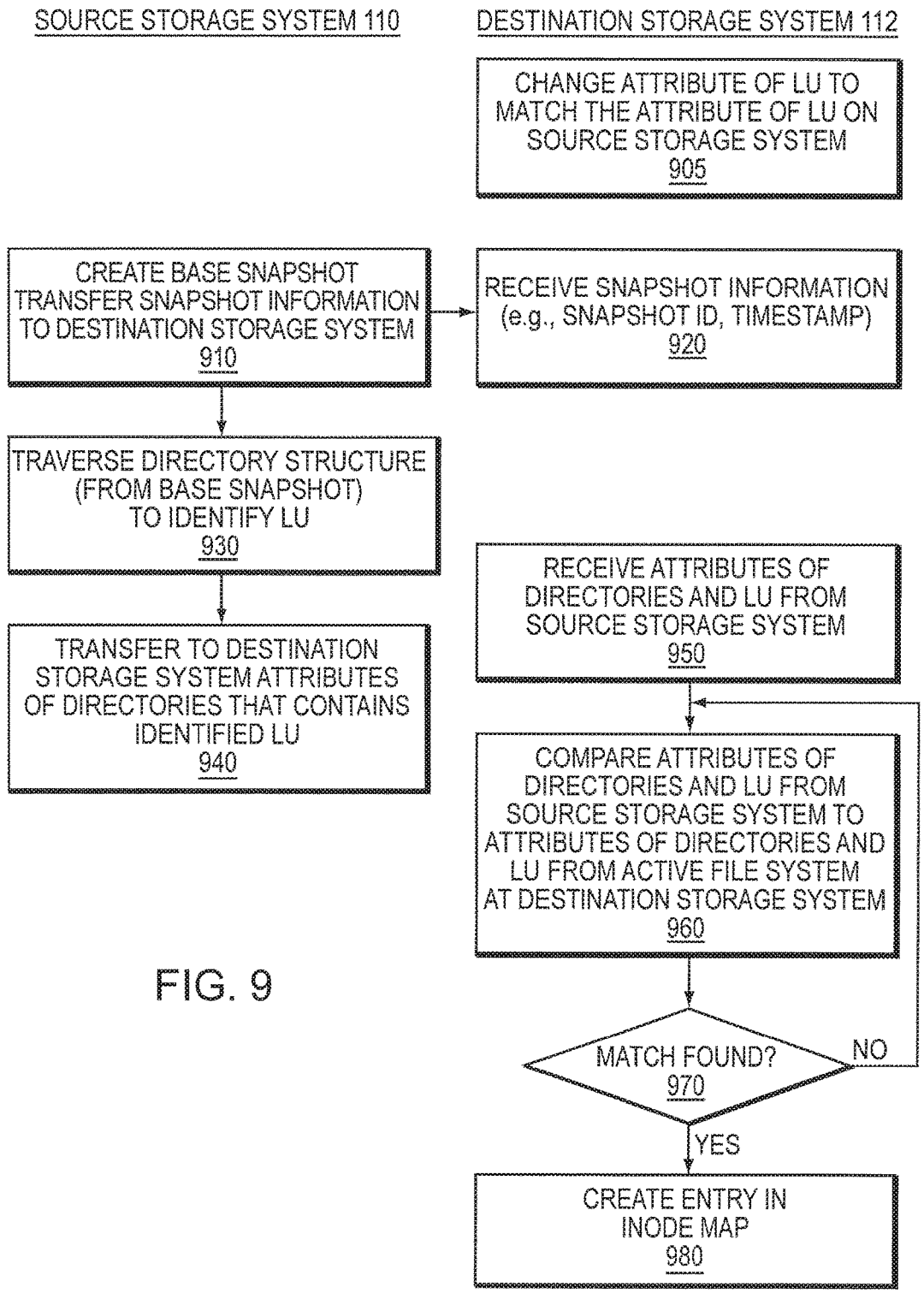
FIG. 9 is an event diagram of a method for converting one mirror relationship to another mirror relationship according to another embodiment of the present invention.

Referring now to FIG. 9, initially, an attribute of the LU (such as name of the LU) at the destination storage system 112 is changed to that of the LU at the source storage system 112 (step 905). Then, mirroring module 295a creates a base snapshot of the LU at the source storage system 110. Mirroring module 295a transfers snapshot information related to the created base snapshot. The information may include, for example, a snapshot identification (ID), a timestamp indicating when the snapshot was created, as well as other data related to the created snapshot. Mirroring module 295b at the destination storage system 112 receives 920 the snapshot information and optionally stores it in memory, e.g., memory 125, at the destination storage system 112. Conversion module 297a then traverses a directory structure to identify a LU (step 930) and transfers to destination storage system 112 attribute(s) of a directory that maintains the LU as well as an inode number of the LU (step 940).

Conversion module 297b at the destination storage system 112 receives the attribute of the directory and the attribute of the LU, at step 950. Optionally, conversion module 297b stores the received attributes in a temporary file in memory (such as memory 125) at the destination storage system 112. Conversion module 2971) receives the attributes (step 950) and compares the received attributes of a directory and the LU from the source storage system to the attributes of a directory and LU in the active file system at the destination system (step 960). If the attributes match, conversion module 297b creates an entry in an inode map (such as inode map 299 shown in FIG. 7) at the destination storage system 112 (step 980). Such an entry includes an inode number of the LU at the source storage system 110 and the inode number of the LU with a matching attribute at the destination storage system 112. Subsequent updates to the data blocks at the source storage system can be replicated to the data blocks at the destination storage system 112 using a technique different from the one that was used to create a copy of the LU at the destination system. Importantly, a copy of the LU that was originally created at the destination storage system 112 does not need to be disconnected from the destination system. As a result, no data is transferred over the network.

Thus, the present invention provides a novel mechanism for converting an existing mirror relationship (physical or logical) between a source storage system and a destination storage system to a new mirror relationship without discarding an existing mirror at the destination storage system.

A person of ordinary skill in the art would understand that although the present invention has been described in the context of transferring names and directories, other attributes of files and directories can be used to implement the present invention.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

The embodiments were chosen and described in order to best explain the principles of the invention and its practical applications, to thereby enable others skilled in the art to best utilize the invention and various embodiments with various modifications as are suited to the particular use contemplated. Moreover, non-dependent acts may be performed in parallel. Furthermore, the use of the phrase "one embodiment" throughout does not necessarily mean the same embodiment. Unless specifically stated otherwise, terms such as "processing" or "computing" or "calculating" or "determining" or "displaying" or the like refer to the action and processes of a computer system or similar electronic computing device that manipulates and, transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of storage device including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method, comprising:
    creating a mapping using matching data container attributes that are within both first data container attributes of a first data structure stored by a first device and second data container attributes of a second data structure stored by a second device, the mapping comprising a first entry mapping a first file of an original dataset within the first data structure to a second file of a copy dataset within the second data structure maintained as a mirrored backup for the first data structure using an existing mirror relationship between the original dataset and the copy dataset;
    converting the existing mirror relationship, corresponding to a first mirror at the first device having a first layout for the copy dataset that is the same as an original layout of the original dataset, to a new mirror relationship having a second mirror with a second layout for the copy dataset that is different than the first layout; and
    utilizing the mapping to facilitate mirroring of changes to the original dataset to the copy dataset using the new mirror relationship.

2. The method of claim 1, wherein the first data container attributes comprise directory and file attributes of directories and files of the original dataset stored by the first device.

3. The method of claim 1, wherein the second data container attributes comprise directory and file attributes of directories and files of the copy dataset stored by the second device.

4. The method of claim 1, wherein the creating a mapping comprises:
    mapping a first inode number of the first file, of the original dataset within the first data structure at the first device, to a second inode number of the second file of the copy dataset within the second data structure at the second device.

5. The method of claim 4, wherein the first inode number is different than the second inode number.

6. The method of claim 1, wherein the second layout, provided by the second mirror for the copy dataset, is different than the original layout of the original dataset.

7. The method of claim 1, comprising:
    adding the first data container attributes to a hash table.

8. The method of claim 1, wherein the mapping comprises an inode map.

9. The method of claim 7, comprising:
    traversing the hash table to compare hash table entries, corresponding to data container attributes of the first data container attributes, to the second data container attributes.

10. The method of claim 1, comprising:
    transferring a file, associated with a first data container attribute, from the original dataset to the copy dataset based upon the first data container attribute of the first data container attributes not matching a second data container attribute of the second data container attributes.

11. The method of claim 1, comprising:
    marking the second mirror as read only.

12. The method of claim 1, wherein the converting the existing mirror relationship comprises:
    retaining a state of the second data structure and the copy dataset before the conversion as the mirrored backup for use by the new mirror relationship after the conversion.

13. The method of claim 1, wherein the utilizing the mapping to facilitate mirroring comprises:
    transferring changed data of the original dataset, but not unchanged data of the original data, to the copy dataset using the new mirror relationship and the mapping.

14. The method of claim 1, wherein the creating a mapping comprises:
    modifying a second inode number of the second file to a first inode number of the first file.

15. The method of claim 14, wherein the modifying a second inode number comprises:
    copying an inode of the second file to a new location identified by the first inode number.

16. The method of claim 14, wherein the modifying a second inode number comprises:
    modifying a directory entry to indicate that the second inode number has been modified.

17. A non-transitory computer readable medium having stored thereon executable program instructions for performing a method which when executed by at least one processor, causes the processor to:
    create a mapping using matching data container attributes that are within both first data container attributes of a first data structure stored by a first device and second data container attributes of a second data structure stored by a second device, the mapping comprising a first entry mapping a first logical unit of an original dataset within the first data structure to a second logical unit of a copy dataset within the second data structure maintained as a mirrored backup for the first data structure using an existing mirror relationship between the original dataset and the copy dataset;
    convert the existing mirror relationship, corresponding to a first mirror at the first device having a first layout that is different than an original layout of the original dataset and created utilizing a first mirroring technique, to a new mirror relationship associated with a second mirroring technique different than the first mirroring technique; and
    utilize the mapping to facilitate mirroring of changes to the original dataset to the copy dataset using the new mirror relationship.

18. The non-transitory computer readable medium of claim 17, wherein the executable program instructions causes the processor to:
    convert the existing mirror relationship to the new mirror relationship while the second logical unit is in a connected state.

19. The non-transitory computer readable medium of claim 17, wherein the executable program instructions causes the processor to:
    transfer updates to data blocks at the first device to replicated data blocks at the second device using the second mirroring technique, wherein the replicated data blocks were created using the first mirroring technique.

20. A computing device comprising:
a memory containing a computer readable medium comprising executable program instructions for performing a method; and
a processor coupled to the memory, the processor configured to execute the executable program instructions to cause the processor to:
create a mapping using matching data container attributes that are within both first data container attributes of a first data structure stored by a first device and second data container attributes of a second data structure stored by a second device, the mapping comprising a first entry that maps a first file of an original dataset within the first data structure to a second file of a copy dataset within the second data structure maintained as a mirrored backup for the first data structure using an existing mirror relationship between the original dataset and the copy dataset;
convert the existing mirror relationship, corresponding to a first mirror at the first device having a first layout for the copy dataset that is the same as an original layout of the original dataset, to a new mirror relationship having a second mirror with a second layout for the copy dataset that is different than the first layout; and
utilize the mapping to facilitate mirroring of changes to the original dataset to the copy dataset using the new mirror relationship.

* * * * *